United States Patent
Johansson et al.

(10) Patent No.: US 8,854,998 B2
(45) Date of Patent: Oct. 7, 2014

(54) METHOD OF UE RSRQ MEASUREMENT PRECAUTION FOR INTERFERENCE COORDINATION

(75) Inventors: Per Johan Mikael Johansson, Kungsangen (SE); William Plumb, Charlestown, MA (US); Yih-Shen Chen, Hsinchu (TW)

(73) Assignee: Mediatek Inc. (TW)

( * ) Notice: Subject to any disclaimer, the term of this patent is extended or adjusted under 35 U.S.C. 154(b) by 123 days.

(21) Appl. No.: 13/370,498

(22) Filed: Feb. 10, 2012

(65) Prior Publication Data
US 2012/0207044 A1    Aug. 16, 2012

Related U.S. Application Data

(60) Provisional application No. 61/441,744, filed on Feb. 11, 2011.

(51) Int. Cl.
  *H04L 12/26* (2006.01)
  *H04W 24/10* (2009.01)
  *H04W 36/00* (2009.01)

(52) U.S. Cl.
  CPC .................................. *H04W 24/10* (2013.01); *H04W 36/0094* (2013.01)
  USPC ....................................................... 370/252

(58) Field of Classification Search
  USPC ................... 370/252, 253; 455/423
  See application file for complete search history.

(56) References Cited

U.S. PATENT DOCUMENTS

| | | | |
|---|---|---|---|
| 6,115,417 A | 9/2000 | Matsunaga et al. | 375/226 |
| 2003/0072274 A1 | 4/2003 | Futakata et al. | 370/311 |
| 2005/0220176 A1 | 10/2005 | Zeira et al. | 375/144 |
| 2009/0005029 A1* | 1/2009 | Wang et al. | 455/423 |
| 2010/0284303 A1 | 11/2010 | Catovic et al. | 370/254 |
| 2011/0177806 A1* | 7/2011 | Kazmi et al. | 455/422.1 |
| 2012/0082047 A1* | 4/2012 | Wu | 370/252 |

(Continued)

FOREIGN PATENT DOCUMENTS

| CN | 19333361 A | 3/2007 |
|---|---|---|
| CN | 101815331 A | 8/2010 |

(Continued)

OTHER PUBLICATIONS

International Search Report and Written Opinion of International Search Authority for PCT/CN2012/071018 dated May 17, 2012 (9 pages).

(Continued)

*Primary Examiner* — Gary Mui
(74) *Attorney, Agent, or Firm* — Zheng Jin

(57) ABSTRACT

A method of UE RSRQ measurement precaution for interference coordination is provided. The UE receives radio signals of a neighbor cell under measurement. The neighbor cell applies a TDM silencing pattern for inter-cell interference coordination (TDM ICIC). The UE determines a measurement pattern that includes multiple subframes. The UE performs RSRQ measurements of the cell over multiple subframes and obtains multiple RSRQ measurement samples. The UE derives RSRQ measurement result by estimating the multiple RSRQ samples and applying a weighted average. RSRQ samples estimated to be more applicable are taken into account to more extent (e.g., applied with more weight), and/or RSRQ samples estimated to be less applicable are taken into account to less extent (e.g., applied with less weight, or discarded with zero weight). With UE precaution, a more predictable RSRQ measurement result is produced.

18 Claims, 3 Drawing Sheets

(56) References Cited

U.S. PATENT DOCUMENTS

| | | | |
|---|---|---|---|
| 2012/0083280 A1* | 4/2012 | Liu et al. ........................ | 455/446 |
| 2012/0281563 A1* | 11/2012 | Comsa et al. ................. | 370/252 |
| 2012/0329498 A1* | 12/2012 | Koo et al. ..................... | 455/501 |

FOREIGN PATENT DOCUMENTS

| | | | |
|---|---|---|---|
| EP | 1111815 | A1 | 6/2001 |
| JP | 2001016166 | A | 1/2001 |
| JP | 2003124877 | A | 4/2003 |
| JP | 2012526496 | A | 10/2012 |
| WO | WO2010129933 | | 11/2010 |

OTHER PUBLICATIONS

3GPP TSG RAN WG2#72bis, Motorola Solutions, RSRQ Measurement Restriction Configurations for eICIC, Dublin, Ireland, Jan. 17-21, 2011 (R2-110476).

3GPP TSG RAN WG2#72bis, RAN2, LS on RSRQ Measurement Accuracy with eICIC, Dublin, Ireland, Jan. 17-21, 2011 (R2-110701).

R2-106170, 3GPP TSG WG2 Meeting #72, New Postcom, Resource-Specific Measurement in Connected Mode for eICIC, Jacksonville (FL), USA, Nov. 15-19, 2010 (3 pages).

R2-106293, 3GPP TSG-RAN WG2 Meeting #72, MediaTek, eICIC Impact on Connected Mode UEs, Jacksonville, USA, Nov. 15-19, 2010 (3 pages).

* cited by examiner

METHOD OF UE RSRQ MEASUREMENT PRECAUTION FOR INTERFERENCE COORDINATION

CROSS REFERENCE TO RELATED APPLICATIONS

This application claims priority under 35 U.S.C. §119 from U.S. Provisional Application No. 61/441,744, entitled "Method of UE RSRQ Measurement Precaution," filed on Feb. 11, 2011, the subject matter of which is incorporated herein by reference.

TECHNICAL FIELD

The disclosed embodiments relate generally to wireless network communications, and, more particularly, to UE RSRQ measurement for enhanced inter-cell interface coordination.

BACKGROUND

Inter-cell interference coordination (ICIC) was introduced in Release-8/9 of the 3GPP LTE standards. The basic idea of ICIC is keeping the inter-cell interferences under control by radio resource management (RRM) methods. ICIC is inherently a multi-cell RRM function that needs to take into account information (e.g. the resource usage status and traffic load situation) from multiple cells. Broadly speaking, the main target of any ICIC strategy is to determine the resources (bandwidth and power) at each cell at any time. Then (and typically), a scheduler assigns those resources to users. Static ICIC schemes are attractive for operators since the complexity of their deployment is very low and there is no need for new extra signaling out of the standard. In WCDMA and LTE systems, one-cell frequency reuse deployment is applied, where the entire frequency spectrum can be allocated to a cell and its neighboring cells. Thus, static ICIC mostly relies on the fractional frequency reuse concept, where the total system bandwidth is divided into sub-bands and used by the scheduler accordingly.

LTE Release-8/9 ICIC techniques, i.e., FDM-based ICIC, are not fully effective in mitigating control channel interference. For example, dominant interference condition has been shown when non-CSG (close subscriber group) macrocell users are in close proximity of CSG femtocells. Therefore, enhanced ICIC (eICIC, also referred to as TDM ICIC) has been investigated from Release-10 onwards to provide enhanced interference management. In LTE/LTE-A Release-10, two main inter-cell interference scenarios for eICIC were being discussed: Macro-Pico scenario and Macro-Femto scenario. In general, almost-blank subframe (ABS) or silenced subframe concept is introduced to reduce inter-cell interference. When ABS is applied, the aggressor cell suspends the scheduling or transmits with smaller power so that the victim cell can conduct data transmission in the protected subframes.

In Macro-Pico scenario, a network with macrocells and picocells on the same or overlapping carrier frequency, where picocells are re-expanded to offload more traffic from the macrocells. In this scenario, a macrocell is the aggressor and may introduce strong interferences to picocells, which are called victim cells. ABS is applied in the macrocell so that UEs can try to search for picocells in the protected subframes and to maintain connection at the cell edge of the picocell. In Macro-Femto scenario, a network with non-accessible CSG femtocells deployed on the same or overlapping carrier frequency as macrocells. In this scenario, victims UEs are connected to a macrocell but in the coverage of a femtocell, but cannot be handed over to the femtocell because of non-CGS membership. The femtocell is the aggressor cell and implements a pattern of silenced subframes. The macrocell is the victim cell and makes use of the silenced subframes for the UEs that are in highly interfered situation.

In LTE/LTE-A systems, one radio resource management (RRM) scheme is that the UE may report measurement results to its serving base station (eNB) for better scheduling and mobility management. When eICIC or TDM ICIC is applied, it has been discussed that UE measurements on victim cells shall take place in the silent periods of a silencing pattern. This is especially true for UEs that are served by the victim cell in order to maintain connection to the cell. This is also true when a neighbor cell is the victim cell, otherwise handover to an interfered victim cell would not be possible. In current LTE/LTE-A design, the above measurement behavior is applied in the intra-frequency measurements. For example, a set of TDM measurement restriction is attached to a measurement object in a frequency layer.

For inter-frequency measurements, however, there is no agreement that whether an explicit TDM measurement restriction is needed for UE measurement of neighbor aggressor cells that implement TDM ICIC silencing. In general, without measurement restriction, the RSRQ (reference signal received quality) measurement has high un-predictability when UEs are measuring an aggressor cell that applies TDM ICIC silencing. This is because the RSRQ measurement results depend on which subframes the UE happens to select for measurements. RSRQ is defined by RSRP/RSSI, where RSRP is Reference Signal Received Power and RSSI is Received Signal Strength Indicator. In TDM eICIC measurement, the RSSI value varies among subframes because some of them are sliced subframes, and thus causes RSRQ value fluctuation. As RSRQ is used for mobility, especially for inter-frequency mobility, RSRQ fluctuation could lead to unpredictable mobility behavior and ping-pong effect etc. For example, the RSRQ measurement on a victim cell could be over pessimistic when measurement takes place in the non-protected subframes. Furthermore, it could be expected that UEs from different vendors could give different results.

On the other hand, if measurement restriction is needed for inter-frequency measurements when TDM eICIC is applied, then potentially many measurement restrictions may have to be configured in the UE, which may lead to high complexity in the UE. Another problem is that for inter-frequency scenario, when RSRQ measurement is performed with measurement gaps, the resulting measurement opportunities from combining measurement gaps and TDM ICIC restrictions may be too few, which may cause larger impact. Even if appropriate measurement restriction were agreed for RSRQ measurement, the UEs would still experience large fluctuations in RSRQ measurement results because of too few measurement samples. It is thus an objective of the current invention to improve the RSRQ measurement predictability without requiring an explicit TDM measurement restriction.

SUMMARY

A method of UE RSRQ measurement precaution for interference coordination is provided. The UE receives radio signals of a neighbor cell under measurement. The neighbor cell applies a TDM silencing pattern for inter-cell interference coordination (TDM ICIC). The UE determines a measurement pattern that includes multiple subframes. The UE performs RSRQ measurements of the cell over multiple subframes and obtains multiple RSRQ measurement samples.

The UE derives RSRQ measurement result by estimating the multiple RSRQ samples and applying a weighted average. RSRQ samples estimated to be more applicable are taken into account to more extent (e.g., applied with more weight), and/or RSRQ samples estimated to be less applicable are taken into account to less extent (e.g., applied with less weight, or discarded with zero weight). With UE precaution, a more predictable RSRQ measurement result is produced.

In one embodiment, the UE precaution involves that the UE measures RSRQ and obtains RSRQ measurement samples over a statistically sufficient number of subframes, and then applies an average of the RSRQ measurement samples across the subframes in deriving the final RSRQ measurement result. In one specific example, the measurement pattern is determined to include a plurality of measurement periods. Each of the measurement periods includes a minimum number of consecutive subframes, preferably to be three consecutive subframes or more. A benefit of such method is simplicity.

In a second embodiment, the UE precaution involves that the UE estimates which RSRQ samples are more or less applicable and applies a weighted average in deriving the final RSRQ measurement result. Among all the RSRQ samples, some RSRQ samples that are estimated to be more applicable, then those samples are applied with a more weight in calculating the average. On the other hand, some RSRQ samples that are estimated to be less applicable, then those samples are applied with a less weight in calculating the average. A first way of estimating the RSRQ samples is to compare the RSSI and/or RSRQ sample values and thereby detecting any deviation that shows abnormal difference due to unlucky measurement subframe selection. A second way of estimating the RSRQ samples is to correlate the sample values with a pre-assumed TDM pattern, which is guessed to be the most likely silencing pattern applied by the aggressor cell.

Other embodiments and advantages are described in the detailed description below. This summary does not purport to define the invention. The invention is defined by the claims.

BRIEF DESCRIPTION OF THE DRAWINGS

The accompanying drawings, where like numerals indicate like components, illustrate embodiments of the invention.

DETAILED DESCRIPTION

Reference will now be made in detail to some embodiments of the invention, examples of which are illustrated in the accompanying drawings.

Figure 1:
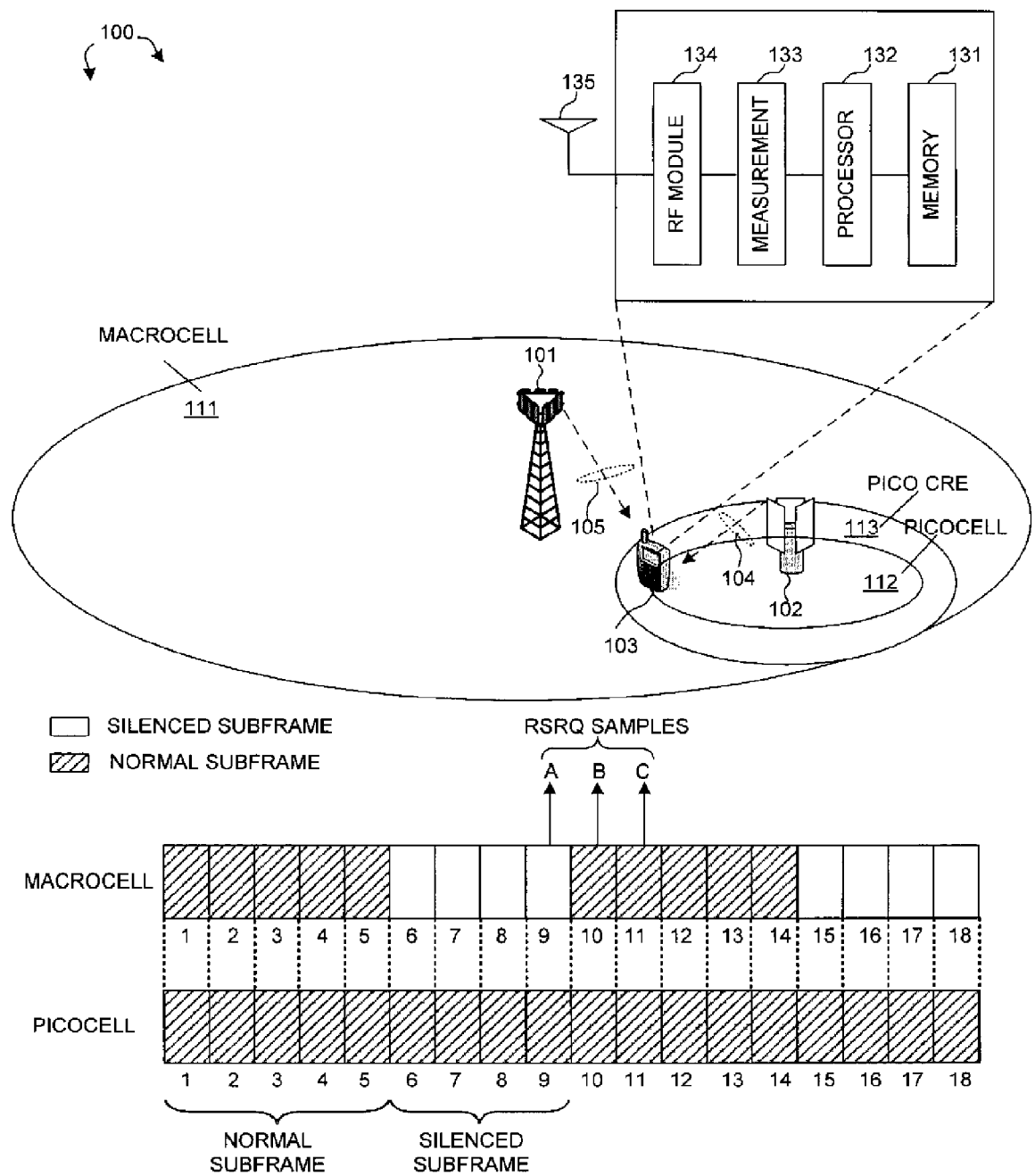
FIG. 1 illustrates a method of UE measurement for interference coordination in a wireless communication system in accordance with one novel aspect.

FIG. 1 illustrates a method of UE measurement for interference coordination in a wireless communication system 100 in accordance with one novel aspect. Wireless network 100 comprises a macro base station MeNB 101, a Pico base station PeNB 102, and a user equipment UE 103. MeNB 101 provides coverage for macrocell 111, while PeNB 102 provides coverage for picocell 112 and a cell region extension (CRE) 113 of the picocell. In the example of FIG. 1, picocell 112 and PICO CRE 113 are located inside overlaying macrocell 111, creating a Macro-Pico inter-cell interference scenario.

In general, for inter-cell interference coordination (ICIC), almost-blank subframes (ABS) or silenced subframes are applied by devices that cause interference (e.g., the aggressors) to protect devices that are subjected to interference (e.g., the victims). ABS or silenced subframes are also referred to as a type of protected radio resource, or interference-protected radio resource. Interference-protected resource is defined as a resource that is not used, not fully used, or partially used by a cell in time domain (e.g., only reference symbols are transmitted), in order to create a better interference situation for UEs connected to or camping on neighbor cells. In 3GPP LTE systems, ABS or silenced subframes are applied as an enhanced ICIC (eICIC) or a time division multiplexing ICIC (TDM ICIC) solution for inter-cell interference coordination.

In 3GPP, the purpose of eICIC or TDM ICIC is to allow heterogeneous cell structures where cells can have very different coverage, and where coverage range of small cells can be expanded by moving the handover border. In such systems, there is a need to explicitly handle interference to prevent UEs from losing control channel communication due to low signal to interference plus noise ratio (SINR). For this purpose, the aggressor cells performs silencing of some subframes, according to a TDM silencing pattern, and those silenced subframes can be used, with improved SINR, by the victim cells for control channel transmission.

In the example of FIG. 1, Macrocell 111 is the aggressor cell and PICO CRE 113 is the victim cell. For example, UE 103 receives radio signal 104 from its serving base station PeNB 102. UE 103 also receives interfering radio signal 105 from neighbor base station MeNB 101. When UE 103 is served in picocell 112, radio signal 104 is strong and interfering signal 105 is relatively weak. However, when UE 103 moves away from PeNB 102 and is served in PICO CRE 113, radio signal 104 becomes weak and interfering signal 105 becomes relatively strong. Therefore, for interference coordination, MeNB 101 applies certain ABS or silenced subframes in macrocell 111 (e.g., the aggressor cell) to protect UE 103 located in PICO CRE 113 (e.g., the victim cell). As depicted in FIG. 1, for normal subframes (e.g., subframes 1-5 and 10-14), PeNB 102 can only schedule UEs located in picocell 112 without range extension. For silenced subframes (e.g., subframes 6-9 and 15-18), PeNB 102 can also schedule UEs located in PICO CRE 113 with much larger range extension, which otherwise would not be schedulable due to high interference from the overlaying macro layer.

In 3GPP LTE systems, one radio resource management (RRM) scheme is that a UE may report measurement results to its serving base station (eNB) for better scheduling and mobility management. When TDM eICIC is applied, it has been discussed that UE measurements on victim cells shall take place in the silent periods of a silencing pattern. Such measurement behavior has been applied in intra-frequency measurements in current 3GPP LTE design. For inter-frequency measurements, however, there is no agreement that whether an explicit TDM measurement restriction is needed for UE measurement of neighbor aggressor cells that implement TDM eICIC silencing. In general, without measurement restriction, RSRQ (reference signal received quality) measurement results have high un-predictability, which may lead to unpredictable mobility behavior. This is because the RSRQ measurement results depend on which subframes the UE happens to select for measurements. On the other hand, if measurement restriction is needed, then potentially many measurement restrictions may have to be configured in the UE, which may lead to high complexity in the UE. In addition, many measurement restrictions may result in too few RSRQ measurement opportunities, which may in turn lead to large fluctuations in RSRQ measurement results because of too few RSRQ measurement samples.

In one novel aspect, UE 103 takes precaution when performing RSRQ measurements for interference coordination without explicit TDM restriction. UE 103 determines a measurement pattern and performs RSRQ measurements over multiple subframes to obtain multiple RSRQ measurement samples. For example, UE 103 performs RSRQ measurements over subframes 9, 10, and 11 to obtain RSRQ measurement samples A, B, and C respectively. Based on the multiple RSRQ measurement samples, UE 103 derives RSRQ measurement result with improved RSRQ predictability without requiring explicit TDM restriction.

FIG. 1 also illustrates a simplified block diagram of UE 103 having various functional modules to carry out embodiments of the present invention. UE 103 comprises memory 131, a processor 132, a measurement module 133, a radio frequency (RF) module 134 coupled to an antenna 135. Antenna 135 transmits and receives RF signals. RF module 134 receives RF signals from antenna 135, converts them to baseband signals, and sends them to processor 132. RF module 134 also converts the received baseband signals from processor 132, converts them to RF signals, and sends out to antenna 135. Measurement module 133 performs RSRQ measurements of received RF signals and derives RSRQ measurement results. Processor 132 processes baseband signals and invokes different function modules to perform functionalities supported by UE 103. Memory 131 stores program instructions and data to control the operation of UE 103. The functional modules may be implemented in software, firmware, hardware, or any combination thereof. The function modules, when executed by the processor, allow UE 103 to perform RSRQ measurement with precaution for interference coordination.

Figure 2:
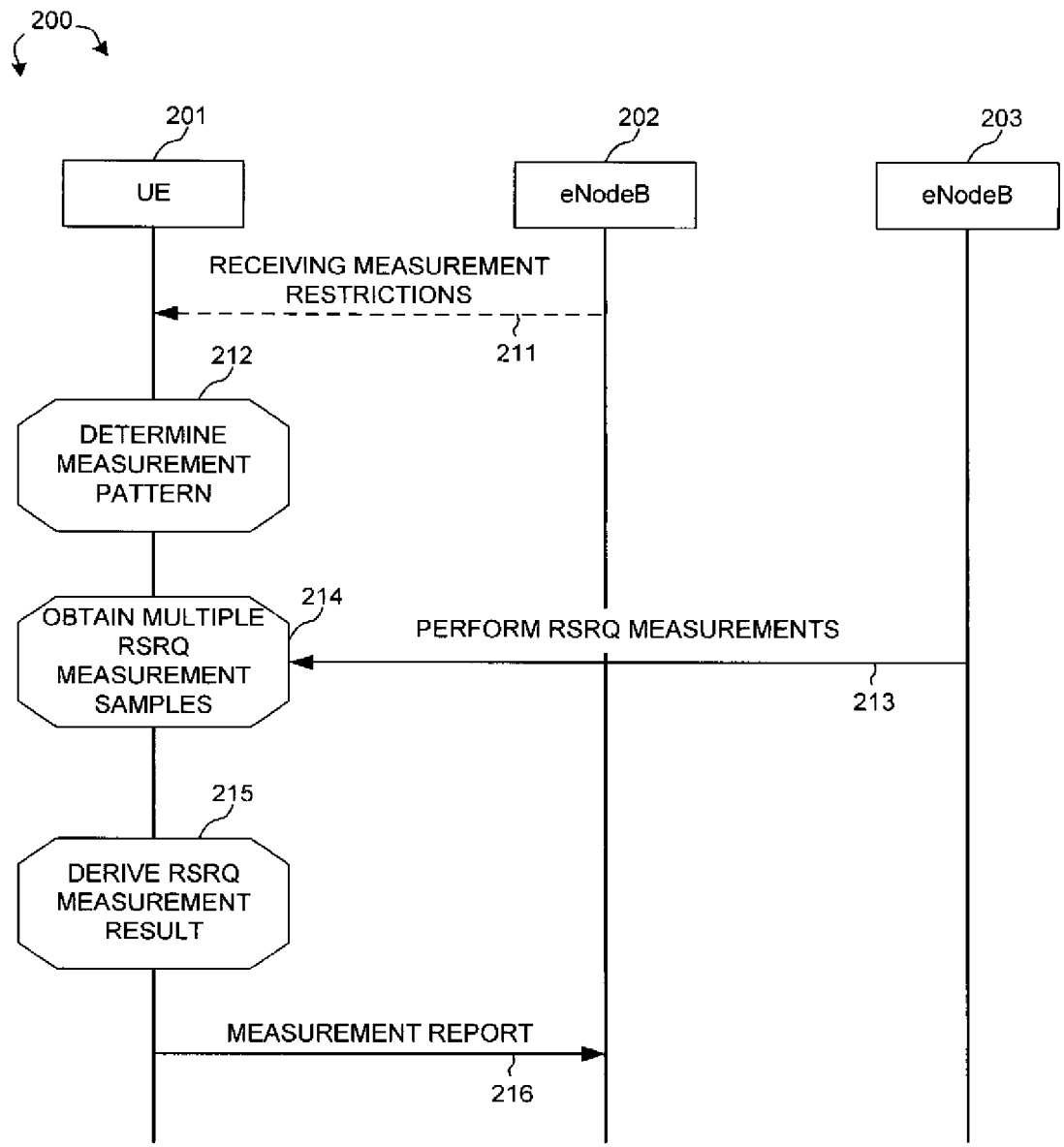
FIG. 2 illustrates an RSRQ measurement procedure by a UE in accordance with one novel aspect.

FIG. 2 illustrates a UE RSRQ measurement procedure in 3GPP LTE system 200 in accordance with one novel aspect. 3GPP LTE system 200 comprises UE 201, a serving eNB 202, and a neighbor eNB 203. UE 201 establishes data signaling connection with serving eNB 202 in a serving cell, while UE 201 also receives radio signals from neighbor eNB 203. In step 211, UE 201 receives measurement restrictions from eNB 202 before performing RSRQ measurement over the serving cell and other neighboring cells. For example, the measurement restriction is a TDM measurement restriction explicitly signaled from eNB 202. UE 201, however, does not require such explicit TDM measurement restriction. In step 212, UE 201 determines a measurement pattern. The measurement pattern may be determined based on the TDM measurement restriction. The measurement pattern may be determined simply to include multiple subframes. For example, the measurement pattern may be determined to contain a plurality of measurement periods, and each period includes a minimum number of consecutive subframes. In step 213, UE 201 performs RSRQ measurements using the determined measurement pattern and thereby obtaining multiple RSRQ measurement samples. In step 215, UE 201 derives a predictable RSRQ measurement result based on the multiple RSRQ measurement samples, with or without explicit measurement restriction. In step 216, UE 201 reports the RSRQ measurement result to serving eNB 202.

There are various ways to derive a predicable RSRQ measurement result. As a general principle, a UE takes precaution to avoid RSRQ measurement unpredictability due to unlucky measurement subframe selection. In a first novel aspect, the UE applies a statistically sufficient averaging on the multiple RSRQ samples in deriving the RSRQ measurement result. In a second novel aspect, the UE estimates the multiple RSRQ samples and apply a weighted average in deriving the RSRQ measurement result. The UE estimates which RSRQ samples are more applicable to be applied with a more weight, and which RSRQ samples are less applicable to be applied with a less weight. Different embodiments of deriving RSRQ measurement results are now described below with details.

Figure 3:
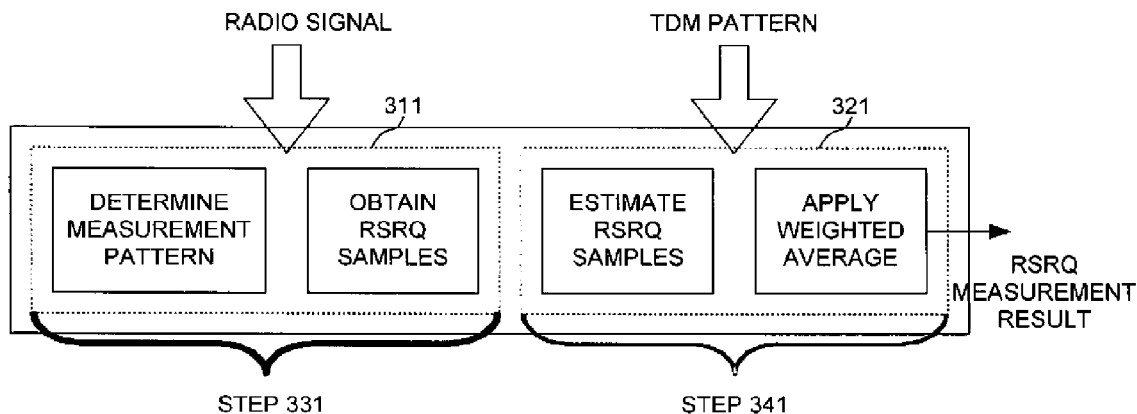
FIG. 3 illustrates a method of UE RSRQ measurement precaution for interference coordination.

FIG. 3 illustrates different embodiments of a method of UE RSRQ measurement precaution for interference coordination. In the example of FIG. 3, a UE comprises an RSRQ measurement sample generation module 311 and a RSRQ measurement result calculation module 321. At a first step 331, RSRQ measurement sample generation module 311 first determines a measurement pattern and then generates multiple RSRQ samples of received radio signals based on the measurement pattern. At a second step 341, RSRQ measurement result calculation module 321 first estimates the multiple RSRQ samples and then applies a weighted average based on the estimation in deriving the RSRQ measurement result.

In a first embodiment, the UE precaution involves that the UE measures RSRQ and obtains RSRQ measurement samples over a statistically sufficient number (e.g., at least three) of subframes, and then applies an average of the RSRQ measurement samples across the subframes in deriving the final RSRQ measurement result. The idea is for the UE to select a measurement pattern that is de-correlated with the TDM silencing pattern performed by the measured cell, to select the subframes in a way to avoid that all subframes happen to be silenced subframes, and to minimize the likelihood that the final RSRQ measurement result is abnormal. In addition, for UE implementations that are less battery sensitive, it is very straightforward to require certain amount of averaging to ensure the predictability of the final RSRQ measurement result, even though some abnormal RSRQ measurement samples may still happen to be used.

In one specific example of the first embodiment, the measurement pattern is determined to include a plurality of measurement periods. Each of the measurement periods includes a minimum number of consecutive subframes. For example, the minimum number of consecutive subframes is preferred to be at least three or even larger. A benefit of such method is simplicity. The UE does not really need to determine a specific measurement pattern or to guess any possible TDM silencing pattern applied by the measured cell. The UE only needs to apply a normal average (e.g., with equal weighting) across the consecutive subframes. By using a measurement pattern of consecutive subframes, it is the simplest strategy to avoid that all subframes happen to be silenced subframes when the measured cell is performing TDM ICIC silencing, and thus to ensure the predictability of the final RSRQ measurement result.

In a second embodiment, the UE precaution involves that the UE estimates which RSRQ samples are more or less applicable and applies a weighted average in deriving the final RSRQ measurement result. Among all the RSRQ samples, some RSRQ samples that are estimated to be more applicable, then those samples are applied with a more weight in calculating the average. On the other hand, some RSRQ samples that are estimated to be less applicable, then those samples are applied with a less weight in calculating the average. The idea is for the UE to take into account more (or less) applicable samples to more (or less) extent such that the final RSRQ measurement result becomes more predictable. The RSRQ measurement samples may be estimated via various ways.

A first way of estimating the RSRQ samples is to compare the RSSI and/or RSRQ sample values and thereby detecting any deviation that shows abnormal difference due to unlucky measurement subframe selection. In TDM eICIC measurement, it is assumed that no physical downlink control channel (PDCCH) is transmitted in silent subframes from the aggressor cell. The corresponding RSSI would be low (high RSRQ). Contrarily, all the cells may send PDCCH in normal subframes. The corresponding RSSI would be high (low RSRQ). Therefore, if the measured cell is an aggressor cell that applies silencing pattern, then RSRQ samples with high RSSI is taken into account to more extent (e.g., applied with a more weight=0.75), while RSRQ samples with low RSSI is taken into account to less extent (e.g., applied with a less weight=0.25). On the other hand, if the measured cell is a victim cell, then RSRQ samples with high RSSI is taken into account to less extent, while RSRQ samples with low RSSI is taken into account to more extent. The UE can also discard certain detected measurement sample (e.g., applied with weight=0) if the detected sample value deviates from the remaining sample values. Detecting and filter out abnormal samples is implementation wise very simple. The main benefit of such approach is simplicity.

A second way of estimating the RSRQ samples is to correlate the sample values with a pre-assumed TDM pattern, which is guessed to be the most likely silencing pattern applied by the aggressor cell. The UE may obtain the pre-assumed TDM silencing pattern based on knowledge of subframes used to transmit broadcasting control information in the victim cell. For example, broadcasting control information is typically transmitted via subframes in a broadcasting channel (BCH), a master information block or system information block (MIB/SIB), and a paging channel (PCH). The UE thus may assume that the same subframes are the silenced subframes. The UE may also obtain the pre-assumed TDM silencing pattern based on knowledge about TDM silencing patterns applied in neighbor cells. For example, the UE was previously connected to another neighbor cell and has gained such knowledge.

With a known TDM silencing pattern, the UE can make intelligent calculation in deriving the RSRQ measurement result. When measuring an aggressor cell that performs TDM silencing, RSRQ samples in a silenced subframe are taken into account to less extent, and/or RSRQ samples in a normal subframe are taken into account to more extent in deriving the RSRQ measurement result. As a result, measurement samples are averaged in such a way that samples from likely TDM silencing patterns have limited effect (e.g., applied with a less weight), or even discarded (e.g., applied with weight=0) from the final measurement result. Similarly, when measuring a victim cell, RSRQ samples in a silence subframe are taken into account to more extent, and/or RSRQ samples in a normal subframe are taken into account to less account in deriving the RSRQ measurement result. In one example, the UE is able to identify whether the measured cell is an aggressor cell or a victim cell via signaled indication, e.g., a PCI (physical cell identity) range.

Figure 4:
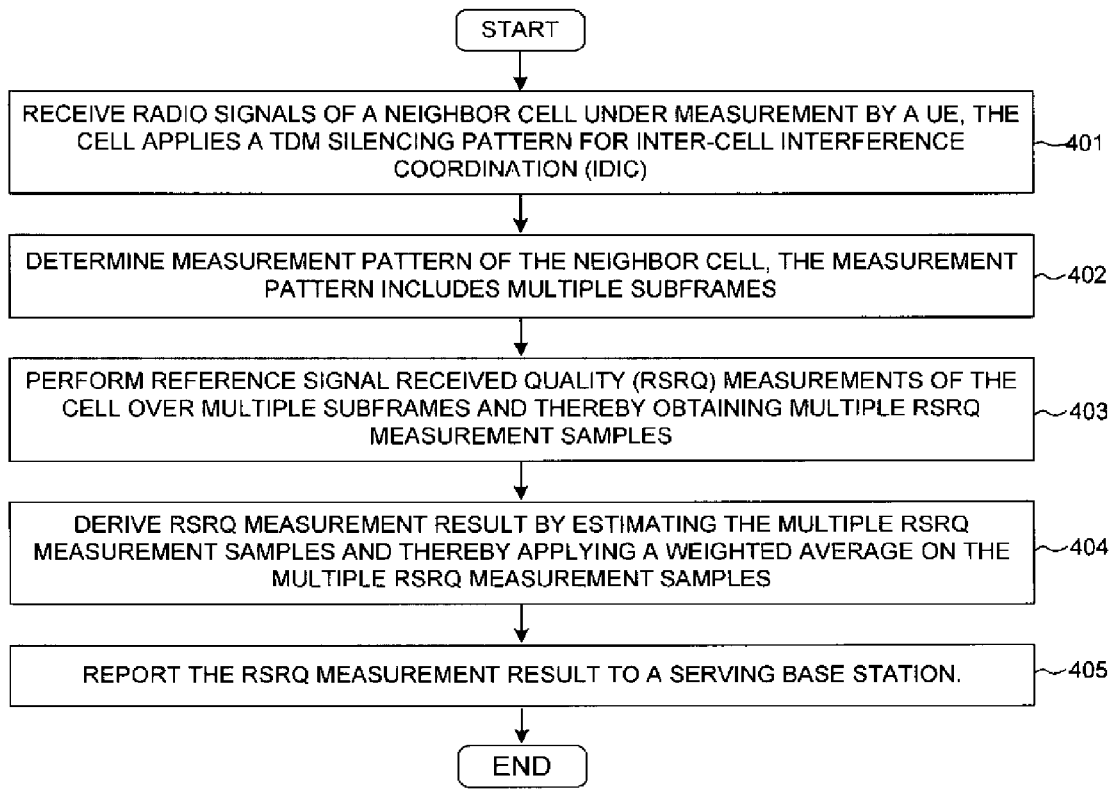
FIG. 4 is a flow chart of a method of UE RSRQ measurement precaution for interference coordination.

FIG. 4 is a flow chart of a method of UE RSRQ measurement precaution for interference coordination. In step 401, a UE receives radio signals of a neighbor cell under measurement. The neighbor cell applies a TDM silencing pattern for inter-cell interference coordination (TDM ICIC). In step 402, the UE determines a measurement pattern that includes multiple subframes. In step 403, the UE performs RSRQ measurements of the cell over multiple subframes and obtains multiple RSRQ measurement samples. In step 404, the UE derives RSRQ measurement result by estimating the multiple RSRQ samples and applying a weighted average. RSRQ samples estimated to be more applicable are taken into account to more extent (e.g., applied with more weight), and/or RSRQ samples estimated to be less applicable are taken into account to less extent (e.g., applied with less weight, or discarded with zero weight). In step 405, the UE reports the RSRQ measurement result to a serving base station. The benefit of such UE implemented RSRQ measurement precaution is that some details can be left for implementation.

Although the present invention has been described in connection with certain specific embodiments for instructional purposes, the present invention is not limited thereto. Accordingly, various modifications, adaptations, and combinations of various features of the described embodiments can be practiced without departing from the scope of the invention as set forth in the claims.

What is claimed is:

1. A method comprising:
   (a) receiving radio signals of a cell under measurement by a user equipment (UE) in a wireless communication system, wherein a neighbor cell applies a TDM silencing pattern for inter-cell interference coordination (ICIC);
   (b) performing reference signal received quality (RSRQ) measurements of the measured cell over multiple subframes and thereby obtaining multiple RSRQ measurement samples; and
   (c) deriving a final RSRQ measurement result by estimating the multiple RSRQ measurement samples of the multiple subframes in the same measured cell and applying a weighted average, wherein RSRQ samples estimated to be less applicable are applied with less weights, wherein RSRQ samples estimated to be more applicable are applied with more weights, and wherein the estimation involves correlating the RSRQ samples of the multiple subframes in the same measured cell with a pre-sumed TDM silencing pattern.

2. The method of claim 1, wherein the TDM silencing pattern includes normal subframes and silenced subframes.

3. The method of claim 2, wherein the measured cell is the neighbor cell, wherein RSRQ samples with lower received signal strength indicator (RSSI) are given less weights than RSRQ samples with higher RSSI.

4. The method of claim 2, wherein the measured cell is a victim cell, wherein RSRQ samples with lower received signal strength indicator (RSSI) are given more weights than RSRQ samples with higher RSSI.

5. The method of claim 1, wherein RSRQ samples in a silenced subframe are given a less weight than RSRQ samples in a normal subframe in deriving the RSRQ measurement result, when the measured cell performs silencing.

6. The method of claim 1, wherein RSRQ samples in a silenced subframe are given a more weight than RSRQ samples in a normal subframe in deriving the RSRQ measurement result, when the measured cell is a victim cell.

7. The method of claim 1, wherein the pre-assumed TDM silencing pattern is based on knowledge of subframes used to transmit broadcasting control information in the measured cell.

8. The method of claim 1, wherein the pre-assumed TDM silencing pattern is obtained from TDM silence patterns in other neighbor cells.

9. The method of claim 1, wherein the RSRQ samples estimated to be less applicable are discarded in deriving the RSRQ measurement result.

10. The method of claim 1, wherein the UE identifies whether the measured cell is an aggressor cell or a victim cell via signaling.

11. A method comprising:
(a) determining measurement pattern by a user equipment (UE) in a wireless communication system, wherein the measurement pattern includes a plurality of measurement periods;
(b) performing reference signal received quality (RSRQ) measurements of a measured cell over the plurality of measurement periods and thereby obtaining multiple RSRQ measurement samples of multiple subframes in the same measured cell, wherein each of the plurality of measurement periods includes a minimum number of consecutive subframes; and
(c) deriving a final RSRQ measurement result by applying a statistically sufficient averaging on the multiple RSRQ measurement samples.

12. The method of claim 11, wherein the minimum number of consecutive subframes is three.

13. A user equipment (UE), comprising:
a radio frequency module that receives radio signals of a neighbor cell in a wireless communication system, wherein the neighbor cell applies a TDM silencing pattern for inter-cell interference coordination (ICIC); and
a measurement module that performs reference signal received quality (RSRQ) measurements over multiple subframes and thereby obtaining multiple RSRQ measurement samples, wherein the measurement module also determines RSRQ measurement result by estimating the RSRQ samples of the multiple subframes in the same measured cell, wherein RSRQ samples estimated to be less applicable are applied with less weights, wherein RSRQ samples estimated to be more applicable are applied with more weights, and wherein the estimating involves correlating the RSRQ samples of the multiple subframes in the same measured cell with a fixed pre-assumed TDM silencing pattern.

14. The UE of claim 13, wherein RSRQ samples in a silenced subframe are given a less weight than RSRQ samples in a normal subframe in determining the RSRQ measurement result, when measuring a cell performs silencing.

15. The UE of claim 13, wherein RSRQ samples in a silenced subframe are given a more weight than RSRQ samples in a normal subframe in determining the RSRQ measurement result, when measuring a victim cell.

16. The UE of claim 15, wherein the pre-assumed TDM silencing pattern is based on knowledge of subframes used to transmit broadcasting control information in the victim cell.

17. The UE of claim 16, wherein the broadcasting control information is transmitted via a broadcasting channel (BCH), a master information block or system information block (MIB/SIB), and a paging channel (PCH).

18. The UE of claim 13, wherein the measurement module performs RSRQ measurements over a minimum number of consecutive subframes.

* * * * *